US009657206B2

(12) United States Patent
Greszta-Franz et al.

(10) Patent No.: US 9,657,206 B2
(45) Date of Patent: May 23, 2017

(54) ADHESIVE FORMULATIONS

(71) Applicant: Bayer MaterialScience AG, Monheim am Rhein (DE)

(72) Inventors: Dorota Greszta-Franz, Solingen (DE); Berta Vega Sanchez, Köln (DE); Beate Baumbach, Burscheid (DE); Hans-Josef Laas, Odenthal (DE); Mathias Matner, Neuss (DE)

(73) Assignee: Covestro Deutschland AG, Leverkusen (DE)

( * ) Notice: Subject to any disclaimer, the term of this patent is extended or adjusted under 35 U.S.C. 154(b) by 16 days.

(21) Appl. No.: 14/416,739

(22) PCT Filed: Jul. 24, 2013

(86) PCT No.: PCT/EP2013/065571
§ 371 (c)(1),
(2) Date: Jan. 23, 2015

(87) PCT Pub. No.: WO2014/016325
PCT Pub. Date: Jan. 30, 2014

(65) Prior Publication Data
US 2015/0175859 A1 Jun. 25, 2015

(30) Foreign Application Priority Data
Jul. 27, 2012 (EP) .................................... 12178178

(51) Int. Cl.
| | |
|---|---|
| *C09J 175/04* | (2006.01) |
| *B32B 15/20* | (2006.01) |
| *B32B 7/12* | (2006.01) |
| *B32B 15/085* | (2006.01) |
| *B32B 37/12* | (2006.01) |
| *B32B 37/18* | (2006.01) |
| *C08G 18/79* | (2006.01) |
| *C08G 18/80* | (2006.01) |
| *C08G 18/02* | (2006.01) |

(52) U.S. Cl.
CPC ............... *C09J 175/04* (2013.01); *B32B 7/12* (2013.01); *B32B 15/085* (2013.01); *B32B 15/20* (2013.01); *B32B 37/12* (2013.01); *B32B 37/18* (2013.01); *B32B 37/182* (2013.01); *C08G 18/027* (2013.01); *C08G 18/798* (2013.01); *C08G 18/80* (2013.01); *C08G 18/8016* (2013.01); *C08G 18/8064* (2013.01); *B32B 2255/06* (2013.01); *B32B 2255/26* (2013.01); *B32B 2553/00* (2013.01); *Y10T 428/31587* (2015.04)

(58) Field of Classification Search
CPC .. C08G 18/798; C08G 18/80; C08G 18/8016; C08G 18/8064; C08G 18/027; C09J 175/04; B32B 37/12; B32B 37/18; B32B 37/182; B32B 7/12; B32B 15/12; B32B 15/085; B32B 15/20; B32B 2553/00; B32B 2555/06; B32B 2555/26; Y10T 428/31551; Y10T 428/31562; Y10T 428/31576; Y10T 428/3158; Y10T 428/31587; Y10T 428/31591; Y10T 428/31605
USPC ......... 428/423.1, 423.5, 424.4, 424.6, 424.8, 428/425.1; 156/60; 524/590; 525/453; 528/44
See application file for complete search history.

(56) References Cited

U.S. PATENT DOCUMENTS

| | | | |
|---|---|---|---|
| 5,410,011 A * | 4/1995 | Konishi ............... | C08G 18/798 528/45 |
| 5,814,689 A | 9/1998 | Goldstein et al. | |
| 5,847,044 A | 12/1998 | Laas et al. | |
| 6,043,332 A | 3/2000 | Laas et al. | |
| 7,019,088 B1 | 3/2006 | Lehmann et al. | |
| 7,307,135 B2 | 12/2007 | Spyrou | |
| 8,088,846 B2 | 1/2012 | Hsieh et al. | |
| 8,118,968 B2 | 2/2012 | Moeller et al. | |
| 8,569,440 B2 | 10/2013 | Spyrou et al. | |
| 2006/0173152 A1 * | 8/2006 | Richter et al. ................... | 528/48 |
| 2008/0139753 A1 * | 6/2008 | Spyrou .............. | C08G 18/1875 525/420 |
| 2008/0265201 A1 * | 10/2008 | Spyrou et al. ............... | 252/8.57 |
| 2011/0229645 A1 | 9/2011 | Shaffer et al. | |

FOREIGN PATENT DOCUMENTS

| | | |
|---|---|---|
| DE | 2622951 A1 | 11/1977 |
| DE | 102004048775 A1 | 4/2006 |
| EP | 0495307 A1 | 7/1992 |
| EP | 0601793 A2 | 6/1994 |
| EP | 0803524 A1 | 10/1997 |
| EP | 0896973 A1 | 2/1999 |
| EP | 0978523 A1 | 2/2000 |
| EP | 1522547 A1 | 4/2005 |
| WO | WO-9911690 A1 | 3/1999 |

(Continued)

OTHER PUBLICATIONS

International Search Report for PCT/EP2013/065571 mailed Aug. 21, 2013.

*Primary Examiner* — Thao T Tran
(74) *Attorney, Agent, or Firm* — Drinker Biddle & Reath LLP

(57) ABSTRACT

The present invention relates to adhesive formulations based on uretdione-group-comprising polyaddition compounds that are free of isocyanate groups and monomeric polyisocyanates, and to the use thereof for the production of adhesive bonds between substrates, in particular for the production of flexible film composites.

8 Claims, No Drawings

(56) References Cited

FOREIGN PATENT DOCUMENTS

| WO | WO-0034355 A1 | 6/2000 |
| WO | WO-2006010408 A1 | 2/2006 |
| WO | WO-2006026670 A1 | 3/2006 |

\* cited by examiner

ADHESIVE FORMULATIONS

CROSS-REFERENCE TO RELATED APPLICATIONS

This application is a national stage application (under 35 U.S.C. §371) of PCT/EP2013/065571, filed Jul. 24, 2013, which claims benefit of European Application No. 12178178.5, filed Jul. 27, 2012, both of which are incorporated herein by reference in their entirety.

The present invention relates to adhesive formulations based on uretdione-group-comprising polyaddition compounds that are free of isocyanate groups, and to the use thereof for the production of adhesive bonds between substrates, in particular for the production of flexible film composites.

2K systems based on polyols and isocyanate-terminated polyurethanes of aromatic polyisocyanates belong to the state of the art in the field of flexible packaging composite films (see, for example, G. Henke, Coating, 1996, 29 (79), p. 266-269). The processing of such systems is carried out by 2K metering and mixing devices, which meter the two components in the correct mixing ratio, mix them and pump them into the roll gap of the laminating machine. The application temperatures are typically from 25 to 40° C. In such systems, which for viscosity reasons mostly comprise a large amount of monomer, possible migration of the low molecular weight aromatic polyisocyanates, or reaction products thereof, that may be present in the adhesive with moisture from the adhesive layer is to be regarded as particularly critical. Such migrates are particularly undesirable in the packaging sector, especially in the case of foodstuffs packaging. In addition, the sensitivity of such isocyanate-comprising systems to moisture also during storage and processing is disadvantageous: in order to avoid a loss of quality, storage requires that appropriately tight drums be used and that the drums be used within a short time once they have been opened. Furthermore, the polyol component must generally be dried before it is mixed with the polyurethane component because otherwise a residual amount of moisture can lead to undesirable blistering in the adhesive film. The reaction between the polyisocyanates and moisture can also lead to the formation of a urea layer on the film surface, which can prevent a uniform sealed seam from being formed if the melting point thereof is above the sealing temperature of the film. This effect is referred to among experts as the "anti-seal effect".

A further disadvantage of the monomer-comprising systems, in particular those which comprise readily volatile monomeric diisocyanates, is that their use requires the observation of expensive, legally specified occupational-safety measures.

There has been no lack of attempts to solve the problems described above by using adhesive formulations based on aliphatic isocyanates. Although aliphatic polyisocyanates are less sensitive to moisture and do not naturally form primary aromatic amines when reacted with water, they have a significantly lower reactivity towards polyols than do aromatic polyisocyanates, as is generally known from polyurethane chemistry. Their curing therefore requires high temperatures, a long curing time, or the use of in most cases heavy-metal-comprising catalysts. WO 2006/026670, for example, describes the use of a polyurethane prepolymer based on aliphatic polyisocyanates in an adhesive formulation.

The formulation did not achieve adequate adhesion until after three days at 60° C., even though a heavy-metal-comprising catalyst (dibutyltin dilaurate, DBTL) was additionally added to the polyurethane prepolymer. The long curing time at elevated temperature is not only an obstacle to productivity but can also lead to roll telescoping and creasing. Moreover, on account of the described process of preparing the aliphatic polyurethane prepolymers from monomeric diisocyanates, it is not possible to rule out the possibility that the prepolymers may still comprise residual monomers. In practice, the use of such adhesives would require the content of monomeric diisocyanates to be monitored, which is associated with an additional logistical and financial outlay.

A further possible method of suppressing the formation of migrates is to use adhesive formulations based on polyurethane prepolymers having blocked isocyanate groups. In order to prevent monomeric isocyanates from being released during the curing process, only blocking agents that react not with back-cleavage but, for example, with ring opening are suitable for this use. Such adhesive formulations, based on aromatic polyurethane prepolymers blocked with cyclic carbonates, have been disclosed, for example, in WO 2006/010408. A disadvantage of the adhesive formulations described therein is their low reactivity at room temperature, which means that, despite the use of reactive amines as reaction partner, extremely long curing times of at least 14 days are required.

Isocyanate-group-free adhesives based on uretdiones are likewise known. EP-A 0601793 describes, for example, hydroxyl- and uretdione-group-comprising 1K adhesives, which are largely free of isocyanate groups and cure by thermal cleavage of uretdione rings and subsequent reaction with the hydroxyl groups. However, curing by this method requires temperatures of at least 180° C., which makes the adhesive unsuitable for use in the field of flexible packaging composite films.

WO 1999/011690 discloses isocyanate-group-free, uretdione-group-comprising polyaddition compounds which are suitable according to the exemplary embodiments for the production of surface coatings which cure at room temperature. A disadvantage thereof is long curing times of 14 days using short-chained aliphatic amines as reaction partner. In addition, it cannot be inferred from the examples published therein that these systems can be used in the adhesives sector. Indeed, it is apparent from another publication of the inventors (Goldstein et al., Proc. Int. Waterborne, High-Solids, Powder Coat. Symp., Vol. 28, p. 77-89, 2001) on this subject that these amine-cured surface coatings have poor adhesive properties, which leads to the conclusion that they are unsuitable for adhesives. Furthermore, although the mentioned publication presents the possibility of preparing on the basis of the same isocyanate-group-free, uretdione-group-comprising polyaddition compounds also polyol-curing surface coatings which are cured fully after only 30 minutes at 80° C. or 60 minutes at 60° C., it does not mention the catalysts necessary therefor, which makes the reproduction of such formulations impossible even for the person skilled in the art.

The use of catalysts for lowering the curing temperature of uretdione-group-comprising polyaddition compounds is known in particular in the field of powder coatings. In EP-A 0 803 524, compounds containing N,N,N'-trisubstituted amidine structures, for example, are mentioned as suitable catalysts, and in EP-A 1 522 547, ammonium carboxylates, hydroxides, fluorides, and also metal alcoholates and hydroxides are mentioned as suitable catalysts. WO 2000/034355 claims curable, uretdione-group-comprising compositions comprising Lewis acid catalysts, preferably organometallic compounds, optionally in combination with suitable activators. Although the catalysts mentioned in those publications permit a significant reduction in the curing temperature from approximately 180° C. to approximately 130° C., the exemplary embodiments do not indicate that it would be possible to lower the curing temperature to room temperature.

In US-A 2011/0229645, the use of isocyanate-group-free uretdione formulations in combination with polyols and using specific amine catalysts in surface coatings which cure at room temperature has been described. However, the person skilled in the art was unable to find in that publication any concrete reference to the particular suitability of such formulations for the production of adhesive formulations, in particular in the field of flexible packaging composite films. Indeed, the examples of that publication show that such compounds are unsuitable as adhesives for a flexible film composite owing to curing times of one week.

The object of the present invention was, therefore, to develop novel adhesive formulations based on isocyanate-group-free, aliphatic polyurethanes, which formulations are free of monomeric diisocyanates capable of migration and can be used at low temperatures, in particular also at room temperature. Within the meaning of the present invention, "free of monomeric diisocyanates capable of migration" means that no monomeric diisocyanates are detectable in the adhesive formulations used above the detection limit, or no migrates could be detected above the detection limit in the migration test according to §35 Lebensmittel- und Bedarfsgegenständegesetz (German food and commodities act).

It has now been found, surprisingly, that the stated object can be achieved by the use of isocyanate-group-free, uretdione-group-comprising polyaddition compounds which, optionally in the presence of specific catalysts, already react completely with polyols at room temperature.

The expression "isocyanate-group-free" within the meaning of the present invention does not exclude the possibility that the uretdione-group-comprising polyaddition compounds to be used according to the invention may still comprise small residual amounts of free isocyanate groups. However, these possible residual contents, which are described in greater detail below, are not sufficient to permit curing of the adhesive formulation. This takes place according to the invention by a ring-opening reaction of the uretdione groups with the polyol component.

Accordingly, the invention provides adhesive formulations which comprise uretdione-group-comprising polyaddition compounds that are free of isocyanate groups, and which are used to produce adhesive bonds between substrates, in particular to produce flexible film composites. These are substantially adhesive formulations which comprise one or more uretdione-group-comprising polyaddition compounds, which comprise less than 2 wt. % free isocyanate groups and no monomeric polyisocyanates, and can be used as adhesives at temperatures of less than 100° C. An adhesive formulation according to the invention preferably comprises:

A) at least one uretdione-group-comprising polyaddition compound,
B) optionally a polyol or a polyol formulation,
C) optionally one or more catalysts,
D) optionally further additives, and
E) optionally solvents.

Starting compounds for the uretdione-group-comprising polyaddition compound A) are any desired uretdione-group-comprising polyisocyanates having a mean isocyanate functionality of at least 2.0, as can be obtained in a manner known per se by catalytic dimerisation of some of the isocyanate groups of simple diisocyanates. Any monomeric diisocyanates still present that are left over from the excess used are then removed, usually by distillation, preferably by molecular distillation, particularly preferably by film distillation.

For the preparation of the starting compounds for the uretdione-group-comprising polyaddition compound A) there are suitable any desired diisocyanates having aliphatically, cycloaliphatically, araliphatically and/or aromatically bonded isocyanate groups, for example those of the molecular weight range from 140 to 400, which can be obtained by any desired processes, for example by phosgenation or by a phosgene-free route, for example by urethane cleavage. Suitable diisocyanates are, for example, 1,4-diisocyanatobutane, 1,6-diisocyanatohexane (hexamethylene diisocyanate, HDI), 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3-diisocyanato-2(4)-methylcyclohexane, 1-isocyanato-3,3,5-trimethyl5-isocyanatomethylcyclohexane (isophorone diisocyanate, IPDI), 1-isocyanato-1-methyl-4(3)-isocyanatomethylcyclohexane, 4,4'-diisocyanatodicyclohexylmethane (Desmodur® W), norbornane diisocyanate (NBDI), 2-methylpentane diisocyanate (MPDI), 2,2,4-trimethylhexamethylene diisocyanate/2,4,4-trimethylhexamethylene diisocyanate (TMDI), 1,3-bis(isocyanatomethyl)benzene (m-xylylene diisocyanate, XDI), 1,3-bis(1-isocyanato-1-methyl-ethyl)benzene (tetramethyl-m-xylylene diisocyanate, TMXDI) 1,3- and 1,4-phenylene diisocyanate, 2,4- and 2,6-toluene diisocyanate and arbitrary mixtures of these isomers (TDI), diphenylmethane 2,4'- and/or 4,4'-diisocyanate (MDI) and naphthylene 1,5-diisocyanate (NDI) as well as arbitrary mixtures of such diisocyanates. According to the invention, isophorone diisocyanate (IPDI), hexamethylene diisocyanate (HDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), 1,3-bis(isocyanatomethyl)benzene (m-xylylene diisocyanate, XDI) are preferably used. IPDI and HDI are most particularly preferred.

Uretdione-group-comprising polyisocyanates as starting compounds for component A) are well known and are comprehensively described, for example, in J. Prakt. Chem. 336 (1994) p. 185-200. The reaction of isocyanates to uretdiones generally takes place in the presence of dimerisation catalysts, such as, for example, dialkylaminopyridines, trialkylphosphines, phosphorous acid triamides or imididazoles. The reaction, which is optionally carried out in solvents but preferably in the absence of solvents, is stopped by addition of catalyst poisons when a desired conversion is reached. Excess monomeric isocyanate is then separated off by short-path evaporation. If the catalyst is sufficiently volatile, the reaction mixture can simultaneously be freed of the catalyst in the course of the monomer separation. The addition of catalyst poisons can in that case be omitted.

The reaction of these uretdione-group-carrying polyisocyanates to the uretdione-group-comprising polyaddition compound A) involves the reaction of the free isocyanate groups with hydroxyl-group-comprising monomers or polymers, such as, for example, polyesters, polythioethers, polyethers, polycaprolactones, polyepoxides, polyester amides, polyurethanes or low molecular weight di-, tri- and/or tetra-alcohols as chain extenders and optionally monoamines and/or monoalcohols as chain terminators, optionally with the concomitant use of further diisocyanates in an amount of up to 30 wt. %, based on the total weight of all the components, and while maintaining an equivalent ratio of isocyanate groups to isocyanate-reactive groups of from 1.2:1 to 0.5:1, preferably from 1.1:1 to 0.7:1, particularly preferably from 1:1 to 0.9:1. The preparation of such uretdione-group-comprising polyaddition compounds has already been described frequently (e.g. in U.S. Pat. No. 5,814,689 and also in US-A 2011/0229645). Uretdione-group-comprising polyaddition compounds A) which can be used according to the invention have a content of free isocyanate groups of less than 2 wt. %, preferably of less than 1 wt. % and particularly preferably of less than 0.5 wt. %, and a content of isocyanate groups present as uretdione (calculated on solid as NCO, molecular weight 42) of from 1 to 20 wt. %, preferably from 3 to 17 wt. %, particularly preferably from 5 to 15 wt. %. In addition to the uretdione groups, the polyaddition compounds A) can optionally also comprise isocyanurate, biuret, allophanate, urethane and/or urea structures.

There can be used as the polyol or polyol formulation B) all compounds known to the person skilled in the art that have a mean OH functionality of at least 1.5. Such compounds can be, for example, low molecular weight diols (e.g. 1,2-ethanediol, 1,3- or 1,2-propanediol, 1,4-butanediol), triols (e.g. glycerol, trimethylolpropane) and tetraols (e.g. pentaerythritol), but also higher molecular weight polyhydroxy compounds such as polyether polyols, polyester polyols, polycarbonate polyols and also polythioether polyols. Preference is given, however, to those polyester and polyether polyols which have a hydroxyl content of from 0.2 to 22 wt. %, preferably from 0.8 to 15 wt. % and particularly preferably from 1.2 to 12 wt. %, and a mean functionality of from 2 to 6, preferably from 2 to 5 and particularly preferably from 2 to 4.

Polyester polyols B) can be prepared in known manner by polycondensation of low molecular weight polycarboxylic acid derivatives, such as, for example, succinic acid, adipic acid, suberic acid, azelaic acid, sebacic acid, dodecanedioic acid, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimer fatty acid, trimer fatty acid, phthalic acid, phthalic anhydride, isophthalic acid, terephthalic acid, citric acid or trimellitic acid, with low molecular weight polyols, such as, for example, ethylene glycol, diethylene glycol, neopentyl glycol, hexanediol, butanediol, propylene glycol, glycerol, trimethylolpropane, 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol, or by ring-opening polymerisation of cyclic carboxylic acid esters, such as ε-caprolactone. Hydroxycarboxylic acid derivatives, such as, for example, lactic acid, cinnamic acid or ω-hydroxycaproic acid, can also be polycondensed to polyester polyols. It is also possible, however, to use polyester polyols of oleochemical origin. Such polyester polyols can be prepared, for example, by complete ring opening of epoxidised triglycerides of an at least partially olefinically unsaturated fatty-acid-containing fat mixture with one or more alcohols having from 1 to 12 carbon atoms and subsequent partial transesterification of the triglyceride derivatives to alkyl ester polyols having from 1 to 12 carbon atoms in the alkyl moiety.

Polyether polyols B) are likewise known and are obtainable, for example, by the processes described in DE-A 2 622 951, column 6, line 65—column 7, line 47, or EP-A 0 978 523, page 4, line 45 to page 5, line 14, for example by alkoxylation of suitable starter molecules with alkylene oxides.

The alkoxylation reaction can take place with both basic and acid catalysis. Suitable basic catalysts are, for example, alkali hydroxides, such as, for example, sodium or potassium hydroxide, or alkali alcoholates, such as, for example, sodium methylate. There are suitable as acid catalysts, for example, Lewis acids, such as, for example, antimony pentachloride and boron trifluoride etherate, or also double metal cyanide (DMC) catalysts, such as, for example, zinc hexacyanocobaltate. These catalysts are removed following the synthesis, usually by neutralisation, distillation and/or filtration.

Suitable starter molecules for the preparation of the polyether polyols B) used according to the invention are any desired compounds of the molecular weight range from 60 to 200 which are free of aromatic structures and carry from 3 to 6, preferably up to 4, reactive hydrogen atoms. They are, for example, simple aliphatic alcohols having from 3 to 6 carbon atoms, such as, for example, 1,2,3-propanetriol, 1,1,1-trimethylolethane, 1,2,6-hexanetriol, 1,1,1-trimethylolpropane, 2,2-bis(hydroxymethyl)-1,3-propanediol, 1,2,4- and 1,3,5-trihydroxycyclohexane or sorbitol, aliphatic diamines, such as, for example, ethylenediamine, 1,3-propylenediamine, the isomeric butylenediamines, pentylenediamines and hexylenediamines, which can optionally be monosubstituted on a nitrogen atom by alkyl radicals having from 1 to 4 carbon atoms, or also aliphatic polyamines, such as, for example, diethylenetriamine and triethylenetetramine. A further class of suitable starter molecules are additionally alkanolamines, such as, for example, ethanolamine, dialkanolamines, such as, for example, diethanolamine, and trialkanolamines, such as, for example, triethanolamine.

These starter molecules can be used both on their own and in the form of arbitrary mixtures with one another.

Alkylene oxides suitable for the alkoxylation reaction are in particular ethylene oxide and propylene oxide, which can be reacted with the mentioned starter molecules both on their own and in succession in any desired sequence or in the form of arbitrary mixtures with one another.

Particularly preferred polyether polyols B) are addition products of ethylene oxide and/or propylene oxide on 1,2,3-propanetriol, 1,1,1-trimethylolpropane, ethylenediamine and/or pentaerythritol. Most particularly preferred polyether polyols B) are those for whose preparation only propylene oxide is used as the alkylene oxide.

In the production of the adhesive formulations used according to the invention, there can optionally be used concomitantly in the polyol formulation B), in subordinate amounts, also simple low molecular weight alcohols having a functionality of at least three, for example those of a molecular weight range of from 92 to 182. These are used, if at all, in amounts of not more than up to 10 wt. %, preferably up to 5 wt. %, based on the amount of polyol or polyol formulation B).

Irrespective of the nature of the chosen starting materials, in the production of the adhesive formulations used according to the invention the reaction of the uretdione-group-comprising polyaddition compound A) with the polyol or with the polyol formulation B) is carried out while maintaining an equivalent ratio of uretdione groups to hydroxyl groups of from 0.5:1 to 2.0:1, preferably from 0.7:1 to 1.3:1, particularly preferably from 0.8:1 to 1:1. Any residual contents of free isocyanate groups still present in the uretdione-group-comprising polyaddition compound are not taken into consideration when setting the equivalent ratio.

In order to accelerate curing there can be used as catalysts C), for example, the compounds comprising N,N,N'-trisubstituted amidine structures described in EP-A 0 803 524, or the aprotic amines comprising —N═C—N— groups described in US-A 2011/0229645. These are, for example, 1,8-diazabicyclo-5.4.0-undec-7-ene (DBU), 1,5-diazabicyclo-4.3.0-non-5-ene (DBN), 7-methyl-1,5,7-triazabicyclo-4.4.0-dec-5-ene, 1,4,5,6-tetrahydro-1,2-dimethylpyrimidine, 1,2,4-sodium triazolate, and 2-tert-butyl-1,1,3,3-tetramethylguanidine. Likewise suitable as catalysts for the use according to the invention are the tetraalkylammonium carboxylates disclosed in EP-A 1 522 547, such as, for example, tetrabutylammonium acetate or tetrabutylammonium benzoate; hydroxides, such as, for example, benzyltrimethylammonium hydroxide; fluorides, such as, for example, tetrabutylammonium fluoride, and also metal alcoholates and hydroxides, such as, for example, sodium ethanolate or potassium tert-butyl alcoholate. Less preferred, but also suitable, are the organometallic catalysts known from powder coatings, such as the zinc and tin carboxylates, alcoholates and acetylacetonates described, for example, in WO 2000/034355, optionally in combination with an epoxide acting as acid acceptor and an activator in the form of an ammonium or phosphonium salt, as well as the reaction products of zinc carboxylates or zinc acetylacetonates with substituted amidines, such as, for example, zinc (1-methylimidazole)$_2$(acetate)$_2$, described as catalysts in U.S. Pat. No. 8,088,846.

The catalysts mentioned by way of example can be used individually or in the form of arbitrary mixtures with one another and are employed, if at all, in amounts of from 0.01 to 5.0 wt. %, preferably from 0.1 to 3 wt. %, particularly preferably from 0.2 to 1 wt. %, calculated as the total amount of catalysts used, based on the total amount of the starting compounds used.

As well as comprising the components mentioned above, the adhesive formulation can additionally comprise as additives D) also additives known from adhesives technology as formulation aids. Such additives are, for example, the conventional plasticisers, fillers, pigments, light stabilisers, antioxidants, thixotropic agents, adhesion promoters, and optionally further auxiliary substances and additives.

There may be mentioned as examples of suitable fillers carbon black, precipitated silicas, pyrogenic silicas, mineral chalks and precipitated chalks.

Suitable plasticisers are, for example, phthalic acid esters, adipic acid esters, alkylsulfonic acid esters of phenol or phosphoric acid esters.

There may be mentioned as examples of thixotropic agents pyrogenic silicas, polyamides, hydrogenated castor oil secondary products or also polyvinyl chloride.

There can be used as adhesion promoters the known alkoxysilyl compounds, such as, for example, vinyltrimethoxysilane, methyltrimethoxysilane, methyltriethoxysilane, isobutyltrimethoxysilane, isobutyltriethoxysilane, octyltriethoxysilane, octyltrimethoxysilane, propyltriethoxysilane, propyltrimethoxysilane, hexadecyltrimethoxysilane, and also functional silanes, such as, for example, N-aminoethyl-3-aminopropyl-trimethoxysilane, N-aminoethyl-3-aminopropyl-methyl-dimethoxysilane, N-aminoethyl-3-aminopropyl-trimethoxysilane, 3-glycidoxypropylt-rimethoxysilane, 3-glycidoxy-propyltriethoxysilane, mercaptosilanes, bis(3-triethoxysilylpropyl)amine, bis(3-trimethoxysilylpropyl)amine, oligoaminosilanes, 3-aminopropylmethyldiethoxysilane, 3-aminopropyltriethoxysilane, 3-aminopropyltriethoxysilane, triaminofunctional propyltrimethoxysilane, N-(n-butyl)-3-aminopropyltrimethoxysilane, phenyltriethoxysilane, phenyltrimethoxysilane, polyether-functional trimethoxysilanes and 3-methacryloxypropyltrimethoxysilane.

The adhesive formulation can be used without a solvent or in a suitable solvent or solvent mixture. Suitable solvents E) are those which have adequate solubility of the polyol component and the uretdione-group-comprising polyaddition component. Examples of such solvents are benzene, toluene, ethyl acetate, butyl acetate, propyl acetate, methyl ethyl ketone, methyl isobutyl ketone, 2-methoxypropyl acetate. Ethyl acetate and methyl ethyl ketone are particularly preferred. The solvents mentioned by way of example can be used individually or in the form of arbitrary mixtures with one another. By means of the solvent, the solid content of the adhesive formulations—calculated from the total amount of starting compounds used in relation to the total amount of adhesive formulation including solvents—is adjusted to values of from 20 to 60 wt. %, preferably from 25 to 50 wt. % and particularly preferably from 30 to 40 wt. %.

The production of the adhesive formulation from the uretdione-group-carrying component A) and the polyol or polyol mixture B) is carried out by methods known to the person skilled in the art from polyurethane chemistry. The catalyst C) and the additives D) can be added to the polyol or polyol formulation B) or to the uretdione-group-comprising component A), or to both. Preferably, the catalyst C) and the additives D) are added to the polyol or polyol formulation B).

The adhesive formulation according to the invention is suitable for bonding a wide variety of substrates, for example wood, metal, glass, plant fibres, stone, paper, cellulose hydrate, plastics such as polystyrene, polyethylene, polypropylene, polyethylene terephthalate, polyvinyl chloride, copolymers of vinyl chloride and vinylidene chloride, copolymers of vinyl acetate olefins, polyamides, in particular plastics films, metals, in particular films of aluminium, lead or copper. The formulation according to the invention is suitable in particular as a two-component adhesive for bonding paper, cardboard, wood, plastic, metal or stoneware.

The adhesive formulation according to the invention can be applied by any conventional application method to the substrates that are to be bonded, for example by spraying, knife application or by means of roll applicators.

In a particularly preferred embodiment of the invention, the adhesive formulation according to the invention is used in the form of a solvent-free or solvent-comprising laminating adhesive.

The adhesive formulation is preferably used for bonding plastics films, aluminium films, other metal films, plastics films with a vapour-deposited layer of metal, and plastics films with a vapour-deposited layer of metal oxide.

The present invention therefore further provides a process for the production of film composites, which are obtainable by bonding at least two identical or different plastics films and/or metal films over part of their surface or over the whole of their surface using the adhesive formulation according to the invention.

The application of the adhesive formulation according to the invention to the films to be bonded can also be carried out using machines conventionally employed for such purposes, for example using conventional laminating machines.

In a preferred embodiment of the invention, the two components A) and B) of the adhesive formulation are mixed with one another immediately before the film composite is produced, and introduced into the laminating machine or applicator.

In a further preferred embodiment, mixing of components A) and B) can take place in the laminating machine itself immediately upstream of or in the applicator.

In the applicator, the so-called carrier film is coated with the adhesive formulation with a mean dry application weight of from 1 to 9 g/m² and, by being brought into contact with a second film, laminated to form the resulting film composite. Solvents or solvent mixtures which may have been used are removed completely in a drying channel or in another suitable device before the carrier film is brought into contact with the second film.

In order to prepare surfaces for bonding, many different possible methods of pretreatment are known. In general, the material layer should first be free of grease before further cleaning is carried out by other pretreatment methods. In order to ensure this, cleaning steps, for example, with solvents or pre-drying in an oven are possible. For high-performance bonds there are further methods such as, for example, flame treatment, low-pressure plasma or normal-pressure plasma treatment and the corona discharge technique. Pretreatment with adhesion promoters (primers, adhesive primers) is further possible. In a further embodiment of the invention, pretreatment of the material layer is carried out before the adhesive layer is applied by means of a knife.

It is particularly suitable to apply the adhesive layer in the liquid state to the material layer to be bonded, preferably a film, such as, for example, a film of plastic or metal. These cure according to the invention at temperatures below 100° C., in a preferred embodiment of the invention curing takes place at temperatures of from 20 to 100° C., preferably at 75° C., particularly preferably up to 40° C. in the production of flexible packaging films, optionally at pressures of from 1 to 50 bar.

The described process can be repeated several times so that film composites that consist of more than two bonded material layers can be produced.

The invention further provides a composite film produced by the process according to the invention using the adhesive formulation according to the invention.

The invention will be explained by means of the following non-limiting examples.

EXAMPLES

Unless indicated otherwise, all percentages in the following examples are based on weight.

Determination of the content of free isocyanate groups was carried out titrimetrically in accordance with DIN EN ISO 11909. Determination of the total isocyanate content (i.e. the sum of the content of free isocyanate groups and isocyanate groups present as uretdione) was carried out by so-called high-temperature titration, as described in detail, for example, in EP 0 601 793, Synthesis-Comparison Example 1. The content of isocyanate groups present in the form of uretdione structures was calculated from the difference between the total isocyanate content and the content of free isocyanate groups.

The hydroxy content was determined titrimetrically in accordance with DIN 53240 T.2.

The residual monomer contents were measured in accordance with DIN EN ISO 10283 by gas chromatography with an internal standard.

All the viscosity measurements were carried out using a Rheolab® QC rheometer from Anton Paar Germany GmbH (DE) in accordance with DIN EN ISO 3219/A.

The determination of the gelling time of an adhesive formulation was carried out manually on a 100 g batch. The batch is stirred in a beaker at room temperature (23° C.) with a wooden rod. The gelling time was taken as the time at which, when the wooden rod is lifted briefly, threads can no longer be pulled from the batch, but the batch tears like rubber.

The determination of the application weight was carried out as described below: a circle having a size of 1 dm² was cut out of the previously laminated film composite using a circular cutter and weighed. The films were then separated from one another, cleaned with acetone, dried and weighed again. The difference between the two weights multiplied by 100 gives the application weight in g/m².

The adhesion or peel strength of a previously laminated film composite was determined in accordance with DIN 53357-A by the 180° peel test on a tearing machine (Zwick I, manufacturer Zwick Roell). To that end, the test strips were clamped in the holders of the tearing machine in such a manner that they were pulled apart at an angle of 180° relative to one another during the determination (the individual strips formed a 90° angle with the adhesive layer). The speed with which the film composites were pulled apart was 100 mm/minute. The mean value of the applied force necessary to separate the test strips was given as the value of the adhesion.

For determining the sealed-seam strength of a previously laminated film composite in accordance with DIN 55529, a strip approximately 15 cm wide was cut out transversely to the direction of travel of the composite. The strip was folded in the middle, in the direction of travel of the film composite, so that the sealing medium (LDPE) is located above one another on the inside. The sealed seam was sealed for 2 seconds at 120° C. by means of a thermal contact heat sealing device (manufacturer Otto Brugger). When the sealed piece of film had cooled to room temperature, 3 strips each 15 mm wide were cut out transversely to the sealed seam. The seal strength of the test strips was determined on the above-described tearing machine. To that end, the test strips were clamped in the holders of the tearing machine and then pulled apart at a speed of 100 mm/minute. The maximum applied force was given as the value of the seal strength. In addition, the tear profile was also assessed.

Materials Used

Crelane® EF 403: a uretdione-group-comprising, cycloaliphatic polyurethane which is solid at room temperature and has a content of monomeric IPDI of <0.1%, a content of free isocyanate groups of 0.4% and a total isocyanate content of 13.5%; obtainable from Bayer MaterialScience AG.

Desmodur XP® 2730: a uretdione-group-comprising HDI polyisocyanate having a content of monomeric HDI of 0.18%, a content of free isocyanate groups of 22.7% and a viscosity at 23° C. of 90 mPa·s, obtainable from Bayer MaterialScience AG. Hot titration of the product and subsequent calculation in accordance with the method described above gave a content of isocyanate groups present as uretdione of 18.4%.

Desmodur® E XP 2747: a monomer- and solvent-free prepolymer based on HDI, having a content of free isocyanate groups of 16.9% and a viscosity at 23° C. of 2600 mPa·s, obtainable from Bayer MaterialScience AG.

Desmodur® E 23: a monomer-comprising, solvent-free prepolymer based on diphenylmethane diisocyanate (MDI), having a content of free isocyanate groups of 15.4% and a viscosity at 23° C. of 1800 mPa·s, obtainable from Bayer MaterialScience AG.

Desmophen® 670: a weakly branched, solvent-free, hydroxyl-group-comprising polyester having a hydroxyl content of 4.3%, obtainable from Bayer MaterialScience AG.

Desmophen® 1380 BT: a polyol based on polyether, having a hydroxyl content of 11.5% and a viscosity at 25° C. of 600 mPa·s, obtainable from Bayer MaterialScience AG.

Baycolle® AD 2047: a linear, solvent-free, hydroxyl-group-comprising polyester having a hydroxyl content of 1.7% and a viscosity at 75° C. of 7000 mPa·s, obtainable from Bayer MaterialScience AG.

Baycoll® CD 2084: a linear, solvent-free, hydroxyl- and polyether-group-comprising polyester having a viscosity at 75° C. of 120 mPa·s and a hydroxyl content of 2.5%, obtainable from Bayer MaterialScience AG.

Catalyst C1): Addocat® 1872, Rhein Chemie (1,2-dimethyl-1,4,5,6-tetrahydropyrimidine)

Catalyst C2): Lupragen® N 700, BASF (1,8-diazabicyclo-5.4.0-undec-7-ene)

Uretdione-Group-Comprising Polyaddition Compound A1):

A 60% solution of Crelan® EF 403 in ethyl acetate was used as the uretdione-group-comprising polyaddition compound A1). The solution had a viscosity at 23° C. of 3500 mPa·s. The content of isocyanate groups present in the form of uretdione structures was 8.1%.

Uretdione-Group-Comprising Polyaddition Compound A2):

A uretdione-group-comprising IPDI polyisocyanate was prepared as described in Example 3 of EP-A 0 896 973. After removal of the excess monomer, a pale, viscous liquid having a content of free NCO groups of approximately 17.7% was obtained. The calculated content of isocyanate groups present in the form of uretdione groups was 20.1%.

120.0 g of this uretdione-group-comprising IPDI polyisocyanate were then placed in a reaction vessel together with 92.3 g of Desmodur® XP 2730 and heated to 70° C., with stirring. When the mixture was homogenised, 0.09 g of dibutyltin dilaurate was added thereto, and then a mixture of 2,2,4-trimethyl-1,3-pentanediol (58.4 g) and 2-ethylhexan-1-ol (27.4 g) was added dropwise. The mixture was stirred at 70° C. until the titrated content of free isocyanate groups was 0.2%. Ethyl acetate (199.0 g) was then stirred in, and the product was drawn off. The following characteristic data were determined for the product: the content of free isocyanate groups=0.12%; viscosity at 23° C. 430 mPa·s. The content of isocyanate groups present in the form of uretdione structures, determined by high-temperature titration, was 8.2%.

Examples 1 to 12

Examples 1 to 12 were carried out according to the same pattern. The following description is accordingly an example for the whole series. 100 g of the adhesive formulation were prepared at room temperature (approximately 23° C.). To that end, the uretdione-group-comprising polyaddition compound, or the polyisocyanate component, was placed in a reaction vessel and stirred homogeneously with the polyol component. The solvent and the catalyst were then added, where appropriate, and homogenisation was again carried out. A portion of this mixture was immediately applied to the first film (the aluminium side of the precomposite of Wipak Walsrode GmbH WIPAK, PET/Alu (1212) thickness 25 µm) by means of a spiral knife (Erichsen, 50 µm wet layer thickness) and tempered in a circulating-air oven for 3 minutes at 60° C. in order to allow the solvent to evaporate. Immediately thereafter, the second film (LDPE film WL A 161/60 from Wipak Walsrode GmbH, thickness 60 µm, corona pretreated) was applied and pressed down uniformly and without blisters by means of a 2 kg manual roller. The film composite was dried for 10 minutes at 60° C. in a circulating-air oven and then stored for 24 hours at 23° C. and 50% relative humidity.

After storage, the peel strength and the sealed-seam strength of the film composite were determined. In parallel with the production of the film composite, the gelling time of the remaining mixture was also determined. The detailed examples are presented in Table 1 and Table 2.

TABLE 1

Examples 1 to 8 according to the invention

| Example | 1 | 2 | 3 | 4 | 5 | 6 | 7 | 8 |
|---|---|---|---|---|---|---|---|---|
| Polyuretdione A1(g) | 72.47 | 71.96 | 72.42 | 87.10 | | | | |
| Polyuretdione A2 (g) | | | | | 72.16 | 71.65 | 72.16 | 87.00 |
| Desmophen 670 (g) | 27.53 | 27.33 | 27.58 | | 27.84 | 27.64 | 27.84 | |
| Desmophen 1380 BT (g) | | | | 12.30 | | | | 12.40 |
| Addocat PU 1872 (g) | | 0.71 | | | | 0.71 | | |
| Lupragen N 700 (g) | | | 0.14 | 0.60 | | | 0.14 | 0.60 |
| Application weight (g/m$^2$) | * | ~80 | * | ~85 | ~36 | ~52 | * | ~85 |
| Gelling time (minutes) | >24 h | ~20 | ~180 | ~240 | >24 h | ~19 | >240 | >240 |
| Peel strength (N/15 mm) | 3.04 | 4.54 | 6.88 | 2.76 | 2.56 | 5.44 | 5.89 | 2.39 |
| Sealed-seam strength (N/15 mm) | 26.57 | 30.47 | 29.21 | 32.45 | 32.62 | 39.08 | 29.79 | 23.46 |
| Tear profile | Tear | Tear | Tear | Tear | Tear | Delaminated | Tear | Delaminated |

* not measurable because of strong adhesion of the composite

TABLE 2

Examples 9 to 12 not according to the invention

| Example | 9 | 10 | 11 | 12 |
|---|---|---|---|---|
| Desmodur E XP 2747 (g) | 38.76 | 46.98 | | |
| Desmodur E 23 (g) | | | 40.87 | 49.18 |
| Desmophen 670 (g) | 61.24 | 53.02 | 59.13 | 50.82 |
| Ethyl acetate (g) | 10 | 10 | 10 | 10 |
| Application weight (g/m$^2$) | ~75 | ~60 | ~65 | ~67 |
| Gelling time (minutes) | >300 | >500 | 60 | 45 |
| Peel strength (N/15 mm) | 3.56 | 2.74 | 5.33 | 6.00 |
| Sealed-seam strength (N/15 mm) | 21.03 | 16.41 | 30.18 | 42.03 |
| Tear profile | Tear | Tear | Delaminated | Tear |

Examples 1 to 8 according to the invention show that the isocyanate-group-free, uretdione-group-comprising polyaddition compounds are suitable, in combination with polyols, as adhesive formulations for producing film composites and yield equivalent composites to the aromatic 2K polyurethane systems (Examples 11 and 12). The optional concomitant use of suitable catalysts brings about an additional improvement in the adhesive properties (Examples 2 to 4 and 6 to 8).

In addition, the corresponding formulations are distinguished by the fact that acceptable peel and sealed-seam strength is achieved after only one day's storage, which indicates higher reactivity as compared with the conventional aliphatic 2K polyurethane systems from Examples 9 and 10 not according to the invention.

Examples 13 to 16

Examples 13 to 16 were carried out according to the same pattern. The following description is accordingly an example for the whole series. Because the adhesive formulations naturally have limited storability, they were prepared immediately before production of the film composite. 100 g of the adhesive formulation were prepared at room temperature (approximately 23° C.). To that end, the uretdione-group-comprising polyaddition compound, or the polyisocyanate component, was placed in a reaction vessel and stirred homogeneously with the polyol component. The solvent and the catalyst were then added, where appropriate, and homogenisation was again carried out. Adhesive formulation so prepared was used immediately after homogenisation to produce a flexible film composite. The film composites were produced by means of a laboratory coating system from Coatema (model BC 26, width 30 cm, length 12 m, dryer length 7 m). The film composites are produced from a PET/Alu precomposite from Wipak Walsrode GmbH WIPAK 1212 (thickness 25 μm) and an LDPE film from Wipak Walsrode GmbH WIPAK WL A 161/60 (thickness 60 μm, corona pretreated). The aluminium side of the PET/Alu precomposite was coated with the adhesive formulation by means of a pointed knife, dried, bonded to the LDPE and then wound onto a roll core. The belt speed was 2 m/minute, the dryer temperature with incoming air of approximately 100 m³/h was 60° C. Lamination was carried out at a pressure of 4.0 bar. The length of the film composite produced with the adhesive formulation was at least 20 m. The dry layer thickness of the adhesive formulation was between 5 and 10μ. The wound films were stored for 3 or 17 days at 23° C. and 50% relative humidity. After storage, the peel strength and the sealed-seam strength of the film composite were determined.

TABLE 3

Examples 13 to 15 according to the invention amd Example 16 not according to the invention

| Example | 13 | 14 | 15 | 16 |
|---|---|---|---|---|
| Polyuretdione A1(g) | | | | |
| Polyuretdione A2 (g) | 60.7 | 60.7 | 60.8 | |
| Desmodur E 23 (g) | | | | 31.3 |
| Desmophen 670 (g) | 23.6 | 23.6 | 23.6 | |
| Baycoll AD 2047 (g) | | | | 37.8 |
| Baycoll CD 2084 (g) | | | | 30.9 |
| Addocat 1872 (g) | 0.06 | | | |

TABLE 3-continued

Examples 13 to 15 according to the invention amd Example 16 not according to the invention

| Example | 13 | 14 | 15 | 16 |
|---|---|---|---|---|
| Lupragen N 700 (g) | | 0.06 | | |
| Ethyl acetate | 15.6 | 15.6 | 15.6 | |
| Peel strength (N/15 mm) | | | | |
| after 3 days' storage | 6.67 | 6.58 | 5.36 | 2.6 |
| after 17 days' storage | 9.17 | 6.76 | 5.22 | 2.9 |
| Sealed-seam strength (N/15 mm) | | | | |
| after 3 days' storage | 30.54* | 30.75** | 28.29** | 26.72** |
| after 17 days' storage | 32.92** | 35.92** | 31.13 | 26.47** |

*tearing of the sealed seam
**tearing of the film

It has been shown by means of Examples 13 to 15 that the isocyanate-group-free, uretdione-group-comprising polyaddition compounds are suitable according to the invention, in combination with polyols and optionally selected catalysts, for laminating composite films in a roll-to-roll process and yield composites which are even superior to the conventional monomer-comprising aromatic 2K polyurethane systems (Example 16) in terms of their properties.

The invention claimed is:

1. An adhesive formulation consisting of one or more uretdione-group-comprising polyaddition compound that comprising less than 2 wt. % free isocyanate groups and no monomeric polyisocyanates, and which can be used as an adhesive at temperatures of less than 100° C., wherein the uretdione-group-comprising polyaddition compound has a content of isocyanate groups present as uretdione of from 1 to 20 wt. %, a solvent, one or more polyols or a polyol formulation, and one or more additives, including an adhesion promoter, and wherein the solid content of the adhesive formulation is from 20 to 60 wt. %.

2. The adhesive formulation according to claim 1, wherein the uretdione-group-comprising polyaddition compound is combined with the one or more polyols or the polyol formulation while maintaining an equivalent ratio of uretdione groups to hydroxyl groups of from 0.5:1 to 2.0:1.

3. The adhesive formulation according to claim 1, wherein the solid content is from 25 to 50 wt. %.

4. The adhesive formulation according to claim 1, wherein the solid content is from 30 to 40 wt. %.

5. A method for bonding substrates comprising providing the adhesive formulation according to claim 1, applying the adhesive formulation to at least one substrate, exposing the adhesive formulation on the at least one substrate to a temperature of less than 100° C., and forming a bond between the substrates.

6. The method of claim 5, wherein the at least one substrate is paper, wood, plastic, metal or stoneware.

7. A process for the production of a film composite comprising applying the adhesive formula according to claim 1 at least partially over a surface of at least two identical or different plastic films and/or metal films, and bonding the films together.

8. A film composite obtained by the process according to claim 7.

* * * * *